United States Patent
Relin

(10) Patent No.: US 12,080,275 B2
(45) Date of Patent: Sep. 3, 2024

(54) AUTOMATIC LEARNING OF ENTITIES, WORDS, PRONUNCIATIONS, AND PARTS OF SPEECH

(71) Applicant: SoundHound, Inc., Santa Clara, CA (US)

(72) Inventor: Anton V. Relin, Boulder, CO (US)

(73) Assignee: SoundHound AI IP, LLC., Santa Clara, CA (US)

(*) Notice: Subject to any disclaimer, the term of this patent is extended or adjusted under 35 U.S.C. 154(b) by 458 days.

(21) Appl. No.: 17/146,239

(22) Filed: Jan. 11, 2021

(65) Prior Publication Data

US 2021/0312901 A1 Oct. 7, 2021

Related U.S. Application Data

(60) Provisional application No. 62/706,790, filed on Sep. 10, 2020, provisional application No. 63/004,448, filed on Apr. 2, 2020.

(51) Int. Cl.
*G10L 15/02* (2006.01)
*G10L 15/14* (2006.01)
*G10L 15/19* (2013.01)

(52) U.S. Cl.
CPC .............. *G10L 15/02* (2013.01); *G10L 15/14* (2013.01); *G10L 15/19* (2013.01); *G10L 2015/025* (2013.01)

(58) Field of Classification Search
CPC ......... G10L 15/02; G10L 15/14; G10L 15/19; G10L 2015/025; G10L 15/193; G10L 15/187

See application file for complete search history.

(56) References Cited

U.S. PATENT DOCUMENTS

| | | | | |
|---|---|---|---|---|
| 9,852,728 B2* | 12/2017 | Singh | .................... | G06F 40/56 |
| 10,319,250 B2* | 6/2019 | Lokeswarappa | ........ | G10L 15/26 |
| 11,169,991 B2* | 11/2021 | Riva | .................... | G06F 16/285 |
| 11,205,048 B2* | 12/2021 | Lee | ......................... | G10L 25/27 |

(Continued)

OTHER PUBLICATIONS

Stahlberg, Felix, Tim Schlippe, Stephan Vogel, and Tanja Schultz. "Towards automatic speech recognition without pronunciation dictionary, transcribed speech and text resources in the target language using cross-lingual word-to-phoneme alignment." In Spoken Language Technologies for Under-Resourced Languages. 2014.

(Continued)

*Primary Examiner* — Abdelali Serrou
(74) *Attorney, Agent, or Firm* — Platinum Intellectual Property PC

(57) ABSTRACT

Systems for automatic speech recognition and/or natural language understanding automatically learn new words by finding subsequences of phonemes that, if they were a new word, would enable a successful tokenization of a phoneme sequence. Systems can learn alternate pronunciations of words by finding phoneme sequences with a small edit distance to existing pronunciations. Systems can learn the part of speech of words by finding part-of-speech variations that would enable parses by syntactic grammars. Systems can learn what types of entities a word describes by finding sentences that could be parsed by a semantic grammar but for the words not being on an entity list.

6 Claims, 16 Drawing Sheets

(56) References Cited

U.S. PATENT DOCUMENTS

| | | | | |
|---|---|---|---|---|
| 2003/0187649 A1* | 10/2003 | Logan | ............... | G10L 15/26 |
| | | | | 704/E15.045 |
| 2004/0193408 A1* | 9/2004 | Hunt | ............... | G10L 15/08 |
| | | | | 704/E15.014 |
| 2005/0187769 A1* | 8/2005 | Hwang | ............... | G10L 15/063 |
| | | | | 704/240 |
| 2006/0173683 A1* | 8/2006 | Roth | ............... | G10L 15/183 |
| | | | | 704/251 |
| 2010/0057457 A1 | 3/2010 | Ogata et al. | | |
| 2015/0325235 A1* | 11/2015 | Levit | ............... | G06F 40/295 |
| | | | | 704/257 |
| 2016/0358596 A1* | 12/2016 | Singh | ............... | G10L 13/08 |
| 2017/0018268 A1* | 1/2017 | Quast | ............... | G10L 15/063 |
| 2017/0256264 A1* | 9/2017 | Stonehocker | ............... | G10L 15/30 |
| 2017/0365251 A1* | 12/2017 | Park | ............... | G10L 15/063 |
| 2019/0189124 A1* | 6/2019 | Tsunoo | ............... | G10L 15/08 |
| 2019/0220749 A1* | 7/2019 | Feng | ............... | G06F 40/30 |
| 2020/0401659 A1* | 12/2020 | Lee | ............... | G06F 40/30 |
| 2021/0043195 A1* | 2/2021 | Hahn | ............... | G10L 15/187 |

OTHER PUBLICATIONS

Goel, Nagendra, Samuel Thomas, Mohit Agarwal, Pinar Akyazi, Lukáš Burget, Kai Feng, Arnab Ghoshal et al. "Approaches to automatic lexicon learning with limited training examples." In 2010 IEEE International Conference on Acoustics, Speech and Signal Processing, pp. 5094-5097. IEEE, 2010.

Shirali-Shahreza, Sajad, Pieter Luitjens, Natalie Morcos, Wen Xiao, Zhenghong Qian, and Gerald Penn. "Crowdsourcing the Pronunciation of Out-of-Vocabulary Words." In AAAI Workshops. 2017.

Bruguier, Tony, Fuchun Peng, and Françoise Beaufays. "Learning Personalized Pronunciations for Contact Names Recognition." (2016).

Slobada, Tilo, and Alex Waibel. "Dictionary learning for spontaneous speech recognition." In Proceeding of Fourth International Conference on Spoken Language Processing. ICSLP'96, vol. 4, pp. 2328-2331. IEEE, 1996.

Lu, Liang, Arnab Ghoshal, and Steve Renals. "Acoustic data-driven pronunciation lexicon for large vocabulary speech recognition." In 2013 IEEE Workshop on Automatic Speech Recognition and Understanding, pp. 374-379. IEEE, 2013.

Rao, Kanishka, Fuchun Peng, and Francoise Beaufays. "Automatic pronunciation verification for speech recognition." In 2015 IEEE International Conference on Acoustics, Speech and Signal Processing (ICASSP), pp. 5162-5166. IEEE, 2015.

* cited by examiner

| Phoneme | Example | Translation |
| --- | --- | --- |
| AA | odd | AA D |
| AE | at | AE T |
| AH | hut | HH AH T |
| AO | ought | AO T |
| AW | cow | K AW |
| AY | hide | HH AY D |
| B | be | B IY |
| CH | cheese | CH IY Z |
| D | dee | D IY |
| DH | thee | DH IY |
| EH | Ed | EH D |
| ER | hurt | HH ER T |
| EY | ate | EY T |
| F | fee | F IY |
| G | green | G R IY N |
| HH | he | HH IY |
| IH | it | IH T |
| IY | eat | IY T |
| JH | gee | JH IY |
| K | key | K IY |
| L | lee | L IY |
| M | me | M IY |
| N | knee | N IY |
| NG | ping | P IH NG |
| OW | oat | OW T |
| OY | toy | T OY |
| P | pee | P IY |
| R | read | R IY D |
| S | sea | S IY |
| SH | she | SH IY |
| T | tea | T IY |
| TH | theta | TH EY T AH |
| UH | hood | HH UH D |
| UW | two | T UW |
| V | vee | V IY |
| W | we | W IY |
| Y | yield | Y IY L D |
| Z | zee | Z IY |
| ZH | seizure | S IY ZH ER |

```
:
Aukland      AO K L IH N D
:
iphone       AY F OW N
ipo          AY P IY OW
it           IH T
it'd         IH T AH D
it'll        IH T AH L
:
oakland      OW K L AH N D
:
rain         R EY N
:
will         W IH L
:
```

```
:
gold          G OW L D
golf          G AA L F
good          G UH D
goop          G UW P
gopher        G OW F ER
guangzhou     G W AE NG Z AW
:
```

```
:
gold          G OW L D
golf          G AA L F
good(1)       G UH D
good(2)       G AH D
goop          G UW P
gopher        G OW F ER
guangzhou     G W AE NG Z AW
:
```

FIG. 6C

```
:
hamburg
hanoi
hefei
houston
:
```

FIG. 9A

```
I skied <PLACE> yesterday
```

FIG. 9B

```
I skied heavenly yesterday
```

FIG. 9C

```
:
hamburg
hanoi
heavenly
hefei
houston
:
```

FIG. 9D

AUTOMATIC LEARNING OF ENTITIES, WORDS, PRONUNCIATIONS, AND PARTS OF SPEECH

CROSS REFERENCE TO RELATED APPLICATIONS

The present application claims the priority benefit of U.S. provisional patent application 63/004,448, filed on Apr. 2, 2020, titled "AUTOMATICALLY LEARNING NEW WORDS AND ENTITIES," and U.S. provisional patent application 62/706,790, filed on Sep. 10, 2020, titled "AUTOMATIC LEARNING OF ENTITIES, WORDS, PRONUNCIATIONS, AND PARTS OF SPEECH," the disclosures of which are incorporated herein by reference.

BACKGROUND

Sometimes new words appear in a language such as a slang word or name that appears in the news. Conventional automatic speech recognition (ASR) systems cannot recognize the new word when it is spoken unless and until a system developer adds the word to a pronunciation dictionary that the ASR system uses. Similarly, systems that parse sentences according to syntactic grammars cannot parse sentences with new word usages unless and until a system developer correctly identifies all words as to their part of speech. Similarly, a semantic grammar cannot interpret a sentence with an entity value to fill a slot unless and until a system developer adds the entity to an entity list.

As a result, since new words enter languages continuously and at a fast pace, keeping conventional speech recognition systems up to date requires rapid responsiveness and large amounts of manual effort from developers. As new words, entities, and usages enter the language and gain quick usage due to news events or viral spread of memes, conventional ASR systems give a frustrating user experience that hurts sales of device products and services that provide voice user interfaces.

Rao et al. ("AUTOMATIC PRONUNCIATION VERIFICATION FOR SPEECH RECOGNITION") attempts to address the problem of pronunciations of new words with machine-learned classifiers but depends on historical logs, which will not have usages of new words entering the language and still requires manual updating of pronunciation dictionaries and doesn't address part of speech tagging or learning of new entities.

Lu et al. ("ACOUSTIC DATA-DRIVEN PRONUNCIATION LEXICON FOR LARGE VOCABULARY SPEECH RECOGNITION") attempt to learn a lexicon from scratch with weighted finite state transducers or Viterbi approximations, which is both unnecessarily complex and only practical for lexicons much smaller than full languages.

Sloboda et al (DICTIONARY LEARNING FOR SPONTANEOUS SPEECH RECOGNITION) purports to address adding pronunciations to a dictionary but lacks enabling details on how to do so.

Ogata et al (US patent application publication 20100057457A1) proposes adding words to a dictionary by requiring users to supply specific feedback without automatic learning. In reality, few users provide such feedback, and the Ogata system would provide a demanding user experience in practice.

Bruguier et al ("Learning Personalized Pronunciations for Contact Name Recognition") teaches a similar technique with similar drawbacks for learning user-specific pronunciations under manual control.

Shirali-Shahreza et al ("Crowdsourcing the Pronunciation of Out-of-Vocabulary Words") take a similar approach as Bruguier but uses paid workers, which would encounter the same slow pace and expense of adding words.

Others have made attempts that generally follow one of the approaches in the prior art described above.

SUMMARY

The technology described herein, roughly described, provides for automatic learning of entities, words, pronunciations, and parts of speech that may be used separately or in combinations within devices, systems, and methods.

One example includes a method for automatically enhancing natural language (NLU) recognition by recognizing a phoneme sequence from speech audio; tokenizing the phoneme sequence into a token sequence of tokens from a pronunciation dictionary, wherein a phoneme subsequence does not match a token in the pronunciation dictionary; adding a token to the pronunciation dictionary, the token having the phoneme subsequence as its pronunciation. This enables an ASR system to detect and learn words that it could not previously recognize.

Such an example may further perform incrementing an occurrence count of the phoneme subsequence across a multiplicity of speech audio segments, wherein the adding step is conditioned on the occurrence count satisfying (e.g., exceeding or becoming less then, based on design preference) a threshold. This ensures that occasional incorrectly recognized words do not get added to the pronunciation dictionary as if they are correct words.

It is also possible to have examples wherein the pronunciation dictionary is domain specific. This provides for automatically learning words that are specific to a particular domain of conversation, profession, region, dialect, or user profile, which can avoid adding words that are not useful in a general full language dictionary while making the ASR more useful for users that speak according to the specific domain.

Another example is a method for automatically enhancing natural language recognition by recognizing a phoneme sequence from speech audio; tokenizing the phoneme sequence into a token sequence of tokens from a pronunciation dictionary, wherein a phoneme subsequence does not match a token in the pronunciation dictionary; searching the pronunciation dictionary for a token with a pronunciation that is within a specific edit distance of the phoneme subsequence, wherein the edit distance is inversely related to the phonetic similarity of phonemes; and in response to the edit distance for a dictionary token being below a threshold, adding the phoneme subsequence as an alternate pronunciation of the dictionary token. This enables automatically learning different pronunciations of words with multiple pronunciations.

Such examples may further perform incrementing an occurrence count of the phoneme subsequence across a multiplicity of speech audio segments, wherein the adding step is conditioned on the occurrence count exceeding a threshold. This avoids adding occasionally misrecognized pronunciations to the pronunciation dictionary.

It is also possible to have examples wherein the pronunciation dictionary is domain specific. This provides for automatically learning pronunciations that are specific to a particular domain of conversation, which can avoid adding pronunciations that are not useful in a general full language dictionary while making the ASR more useful for users that speak according to the specific domain.

Another example is a method for automatically enhancing natural language recognition by recognizing a phoneme sequence from speech audio; tokenizing the phoneme sequence into a token sequence of tokens from a pronunciation dictionary; tagging tokens as parts of speech, wherein the token sequence cannot be parsed by a grammar; identifying that the token sequence could be parsed by a syntactic grammar if a specific token could be used as a verb; and adding to the dictionary entry for the specific token an indication that it could be used as a verb. This is also applicable to recognition of nouns or other parts of speech. This enables an ASR system to automatically detect and learn the part of speech of new words or new usages of existing words as different parts of speech. That makes parsing sentences according to syntactic grammars possible for evolving language usage.

Such examples may further perform incrementing an occurrence count of the use of the specific token as a verb across a multiplicity of speech audio segments, wherein the adding step is conditioned on the occurrence count exceeding a threshold. This avoids incorrectly tagging occasionally misrecognized words as new usages of the word as a different part of speech.

It is also possible to have examples wherein the pronunciation dictionary is domain specific. This supports grammar syntaxes that are specific to a particular domain, profession, region, dialect, or user profile.

Another example is a method for automatically enhancing natural language recognition by recognizing a phoneme sequence from speech audio; tokenizing the phoneme sequence into a token sequence of tokens from a pronunciation dictionary, wherein a phoneme subsequence does not match a token in the pronunciation dictionary; interpreting the token sequence according to a semantic grammar having a slot for an entity, wherein the subsequence of phonemes is at the location of the slot; and adding, to an entity list, a new entity with the phoneme subsequence as its pronunciation. This enables a natural language understanding system to automatically detect new entities such as names their proper usage in semantic grammars. That allows systems to automatically understand sentences that mention new people, places, things, etc.

Such examples may further perform incrementing an occurrence count of the phoneme subsequence across a multiplicity of speech audio segments, wherein the adding step is conditioned upon the occurrence count exceeding a threshold. This avoids recording occasionally misrecognized words or exceedingly rarely used names as being recognizable entity names.

It is also possible to have examples wherein the entity list is domain specific. This supports systems learning the subjects and objects of discussion for users of certain domain of conversations, professions, regions, cultures, and user profiles while not causing general language ASR and NLU system to incorrectly recognize such entities.

BRIEF DESCRIPTION OF FIGURES

FIG. 4 shows a listing of the Carnegie Mellon University standard English phoneme codes.
FIG. 5A shows an example phoneme sequence.
FIG. 5B shows a token sequence.
FIG. 5C shows entries of a pronunciation dictionary.
FIG. 5D shows a token sequence with a phoneme sequence that does not match a token in a pronunciation dictionary.
FIG. 6A shows entries in a pronunciation dictionary.
FIG. 6B shows a token sequence with a phoneme subsequence that does not match a token in the pronunciation dictionary.
FIG. 6C shows entries in the pronunciation dictionary including an alternate pronunciation of a token.
FIG. 9A shows entries in an entity list.
FIG. 9B shows a semantic grammar.
FIG. 9C shows a token sequence with a token that does not match a known entity for a grammar slot.
FIG. 9D shows the entity list with an added entry.

DETAILED DESCRIPTION

The technology described herein, roughly described, provides for automatic learning of entities, words, pronunciations, and parts of speech, as part of a natural language recognitions system. Natural language recognition can include either or both of automatic speech recognition (ASR) and interpretation of sentences using natural language understanding (NLU). Except where noted, design choices for different aspects are independent of each other and work together in any combination. The term token refers to minimally semantically useful utterances such as words in alphabetic languages such as English or meaningful groups of 1 (such as 我) to several characters (such as 加拿大) in logographic languages such as Chinese. The term system refers to machines, combinations of interacting machines, methods of their operation, methods of their use, or established procedures.

Figure 1:
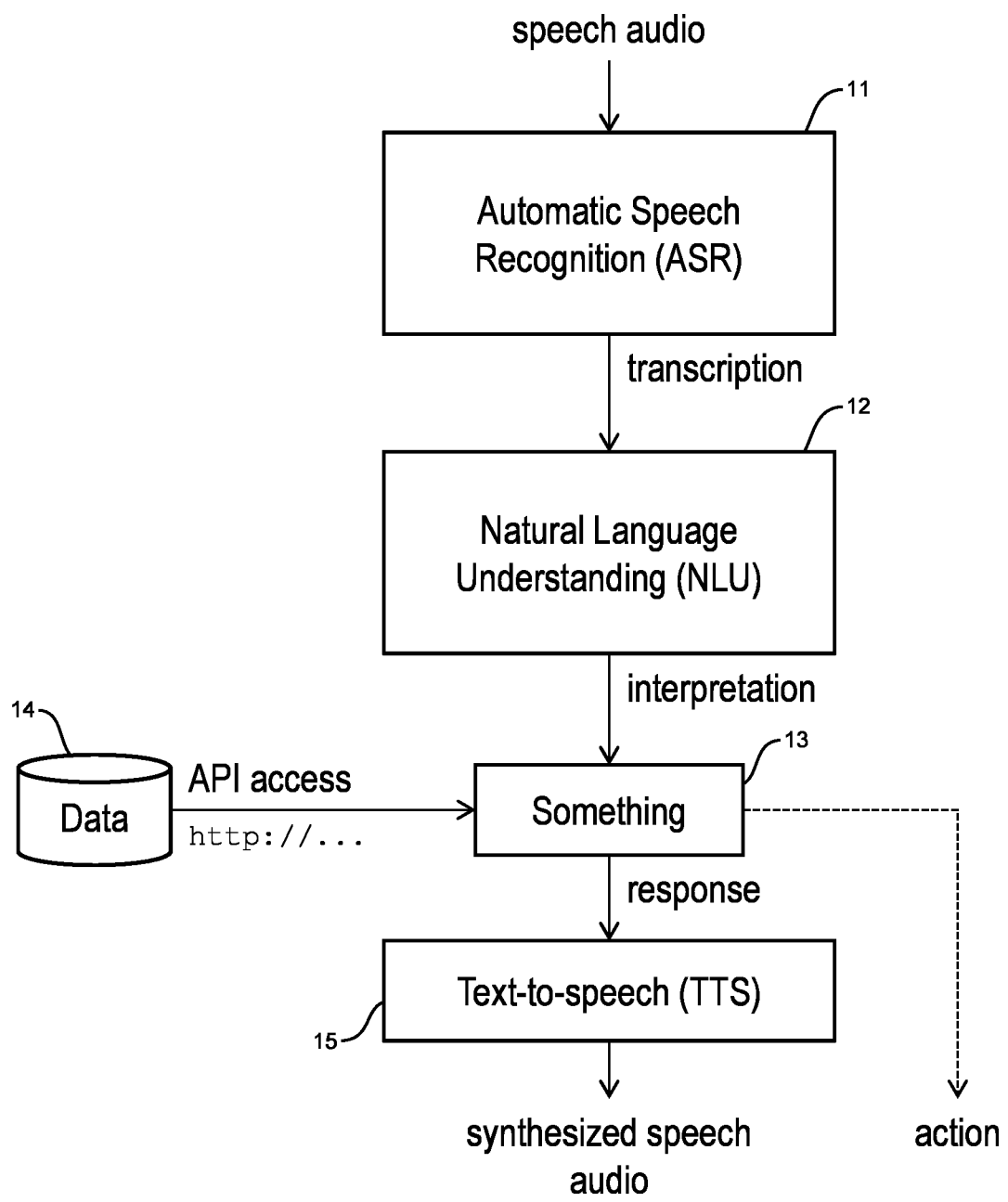
FIG. 1 shows a diagram of a virtual assistant.

One type of system is virtual assistants with voice user interfaces. FIG. 1 shows a block diagram of an example voice virtual assistant. It receives speech audio from a user through means such as a microphone and produces responses, such as answers to queries, in the form of synthesized speech audio. A virtual assistant may optionally also perform actions or cause actions to be performed depending on the request made by the received speech audio.

The virtual assistant of FIG. 1 includes ASR 11, which receives the speech audio and outputs a text transcription or multiple hypothesized text transcriptions with a score for each one representing the probability that it is correct. NLU 12 interprets the one or more transcriptions to produce one or more interpretations with probability scores. Within or outside of NLU, a selection occurs of the most likely correct interpretation. Next, the virtual assistant does something 13 with the selected interpretation. The "something" block includes some action, such as for example querying a data source 14, which occurs in some cases using a web API request at a hypertext transport protocol (HTTP) address. The something 13 that the virtual assistant performs may also include performing an action or causing another system to perform an action. Virtual assistants may do this using a function call that is part of a software development kit (SDK) for specific embedded systems. After doing something 13, the virtual assistant computes a response as text or marked-up text to speak in response to the user. Text-to-speech (TTS) 15 uses the response to synthesize corresponding output speech audio. Either or both of the input and output speech audio may be captured or output directly using local processing or may be exchanged over a network such as the Internet between a client and a server.

Figure 2A:
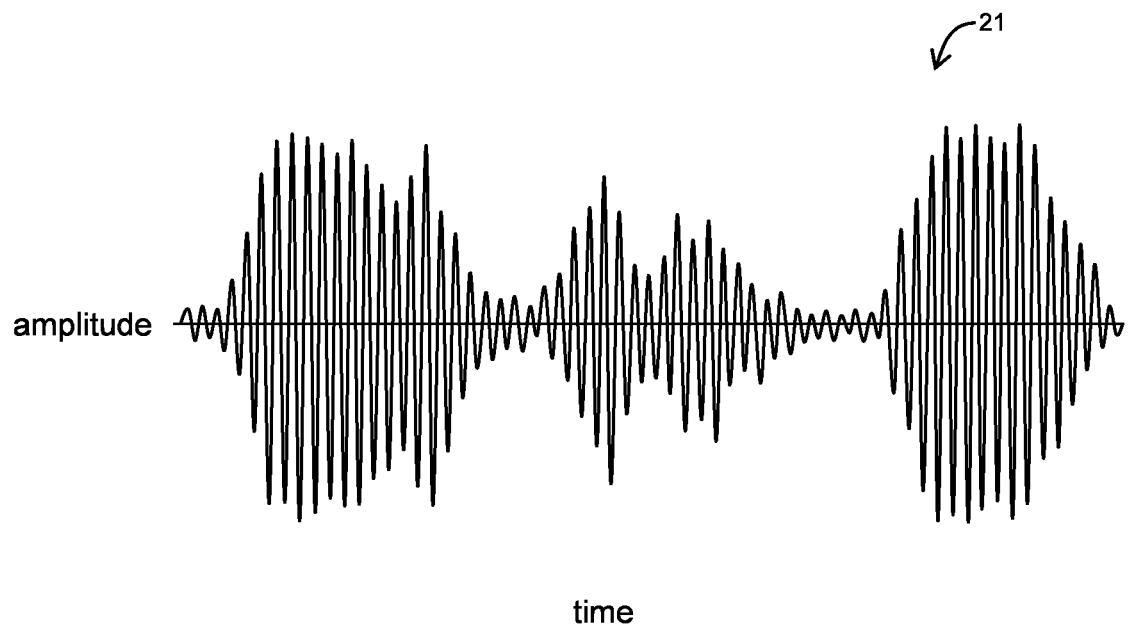
FIG. 2A shows a speech audio waveform.
Figure 2B:
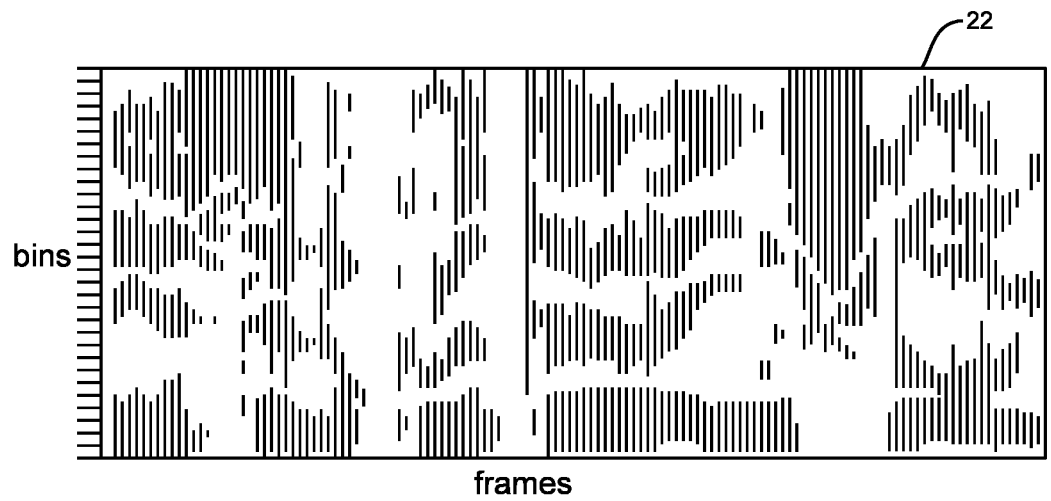
FIG. 2B shows a speech audio spectrogram.

Some example formats of speech audio inputs to a voice virtual assistant or ASR include a directly digitized audio waveform 21 as shown in FIG. 2A, a spectrogram 22 as shown in FIG. 2B, or a spectrogram 22 processed into mel filter bank bin values that efficiently convey acoustic information to ASR.

Figure 3:
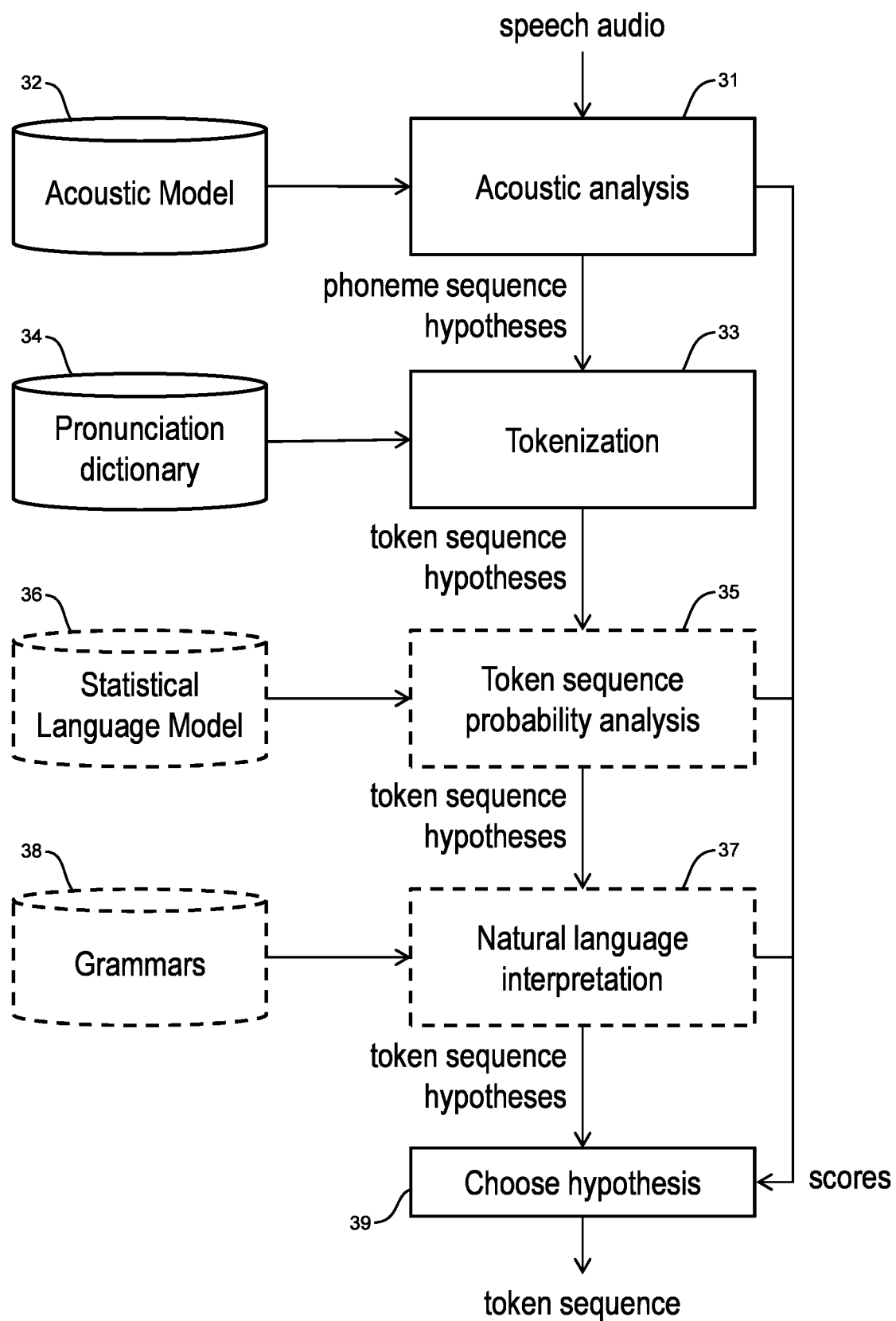
FIG. 3 shows a block diagram of speech recognition with optional natural language interpretation.

Speech recognition involves at least the steps of acoustic analysis and tokenization. FIG. 3 shows a diagram of an example of speech recognition. An acoustic analysis step 31 receives speech audio and performs acoustic analysis according to an acoustic model 32. Some examples of acoustic models are hidden Markov models (HMM) and neural network acoustic models. The acoustic analysis 31 may run repeatedly on windows of speech audio data, for example at intervals around 5 to 25 milliseconds. the time windows can be selected to be frequent enough to capture transitions between even short phonemes of fast speech but not to waste processing power. The acoustic analysis 31 produces at least one phoneme sequence hypothesis. In some examples, the acoustic analysis 31 produces many phoneme sequence hypotheses and might, also, produce a score for each one. The score indicates how likely it is that the phoneme sequence hypothesis is what the speaker intended. In some examples, the system calculates scores by comparing the received speech audio to models of the expected audio patterns for each phoneme.

Tokenization 33 may occur on the one or more phoneme sequence hypotheses. Tokenization uses a pronunciation dictionary. A pronunciation dictionary includes a listing of tokens and the phoneme sequences that make up their pronunciations. For example, an English pronunciation dictionary would have phonemes T and OW for the word "toe" and a Mandarin Chinese pronunciation dictionary would have the phonemes T and OU for the character "頭/头".

FIG. 4 shows a table of the commonly used Carnegie Mellon University standard phoneme codes with example words to illustrate their use. The Hanyu Pinyin system is commonly used for the phonemes of Mandarin Chinese. Many other languages such as Japanese, Korean, German, Spanish, and Italian, use alphabets with almost completely unambiguous mappings between written characters and their phonetic pronunciations.

Tokenization 33 finds sequences of tokens from a pronunciation dictionary 34, the phonemes of which would match the order of phonemes in the phoneme sequence hypothesis. There may be more than one token sequence that matches a given phoneme sequence. For example, the token sequence "ice cream" and "I scream" both match the phoneme sequence AY S KR IY M. On the other hand, there may be phoneme sequences to which no ordered combination of tokens in a pronunciation dictionary would match. For example, an English pronunciation dictionary would be unlikely to support a token sequence having the phoneme sequence S V OW L IH CH. Therefore, English ASR would fail to recognize a phoneme sequence hypothesis with that pattern.

To handle the case in which multiple token sequences match a phoneme sequence hypothesis, some ASR systems may perform a token sequence probability analysis 35 on each token sequence hypothesis. This uses a statistical language model (SLM) 36 to compute a probability of each token sequence hypothesis in order to compute a score for each. For example, AY S K R IY M LAW D LIY could be tokenized as "ice cream loudly" or "I scream loudly". An SLM would recognize that the token combination "cream loudly" is much lower probability than "scream loudly" and so would score the second token sequence as more likely.

Some ASR systems may feed or include natural language interpretation 37. Natural language interpretation 37 may use grammars 38 or equivalent neural network models. Natural language interpretation 37 computes a probability that a token sequence hypothesis is semantically sensible. For example, the sentence "green ideas sleep loudly" is not semantically sensible.

ASR may combine probability scores from acoustic analysis 31, token sequence probability analysis 35, and natural language interpretation 37 to compute a combined score for each of multiple token sequence hypotheses. The hypothesis with the highest score is selected 39 as the recognized token sequence for the speech audio.

In some ASR systems, if tokenization 33 does not find a combination of tokens in a pronunciation dictionary to match a phoneme sequence hypothesis, the ASR system fails to recognize the speech.

Adding Tokens to a Dictionary

FIG. 5A shows a phoneme sequence. Tokenization according to an English pronunciation dictionary will produce a token sequence hypothesis "will it rain in Auckland tomorrow" as shown in FIG. 5B. FIG. 5C shows tokens and corresponding phoneme sequences within sections of an English pronunciation dictionary.

FIG. 5D shows another phoneme sequence hypothesis that has been tokenized.

However, for the hypothesis of FIG. 5D, the tokenizer determined that it could not find a sequence of tokens from the pronunciation dictionary to match a subsequence of the phoneme sequence. It proceeds to disregard the subsequence of phonemes, G UW Z EH N EH ZH and create a token sequence hypothesis "I skied <token subsequence> yesterday". Some examples of the present SLM system can ignore unknown n-grams (phrases of 1, 2, 3, or more tokens) and compute a probability score. This token sequence would be likely to have a high probability score in English. A natural language grammar with a slot for place names may match the token sequence except for the unknown phoneme subsequence not corresponding to a known place name. As a result, ASR might find that this is a likely token subsequence if G UW Z EH N EH ZH corresponds to a new token.

As a result, some examples of the present ASR system can present the phoneme subsequence G UW Z EH N EH ZH to a system developer to research and consider for addition to a pronunciation dictionary. A system developer searching a world map would find the ski resort of Guzet-Neige in the French Pyrénées mountain region and realize that the phoneme subsequence corresponds to the name of that place.

For languages with unambiguous phoneme to lexeme mappings, the pronunciation dictionary will therefore know the spelling for the token. For pictorial character-based languages, the ASR system might guess at a written character from sub-character radials that match the phoneme sequence or send a request to a system developer to find an appropriate character or character sequence. For languages with ambiguous phoneme to lexeme mappings, such as English, the ASR system may apply general rules to guess at the spelling of the new word or may send a request to a system developer to investigate the new word.

Some ASR systems of the present technology are designed for specific domains of speech, specific regions or dialects, or specific types of users. For example, an ASR system for medical professionals may have a special pronunciation dictionary with the names of medications. Pharmaceutical marketing professionals choose many such names to sound like conversational words with curative connotations. However, general conversational human-machine interfaces rarely need to recognize such pharmaceutical names. So, a general language ASR system might exclude those words from its pronunciation dictionary. As a result, some domain specific ASR systems will add new tokens to a domain specific pronunciation dictionary. Similarly, some region-specific or dialect-specific ASR systems will keep separate occurrence count per region, dialect, or user type.

This process ensures that a system quickly detects new tokens entering a language and adds them to a pronunciation dictionary only if approved by an expert as actual new tokens.

Automating the Adding of Tokens

Some examples of the present ASR system can automatically add tokens to a pronunciation dictionary. The ASR system might compare the phoneme subsequence to a list of previously detected unknown phoneme subsequences. If it finds the phoneme subsequence in the list, the system increments a count of occurrences of the phoneme subsequence across many speech audio segments. If the phoneme subsequence is not in the list, the ASR system may add it to a list with an occurrence count of 1. After an occurrence count that satisfies (e.g., exceeds a threshold or becomes less than a threshold, based on design preference), a condition is met for an ASR system may automatically add the phoneme subsequence to the pronunciation dictionary as a new token.

Figure 10:
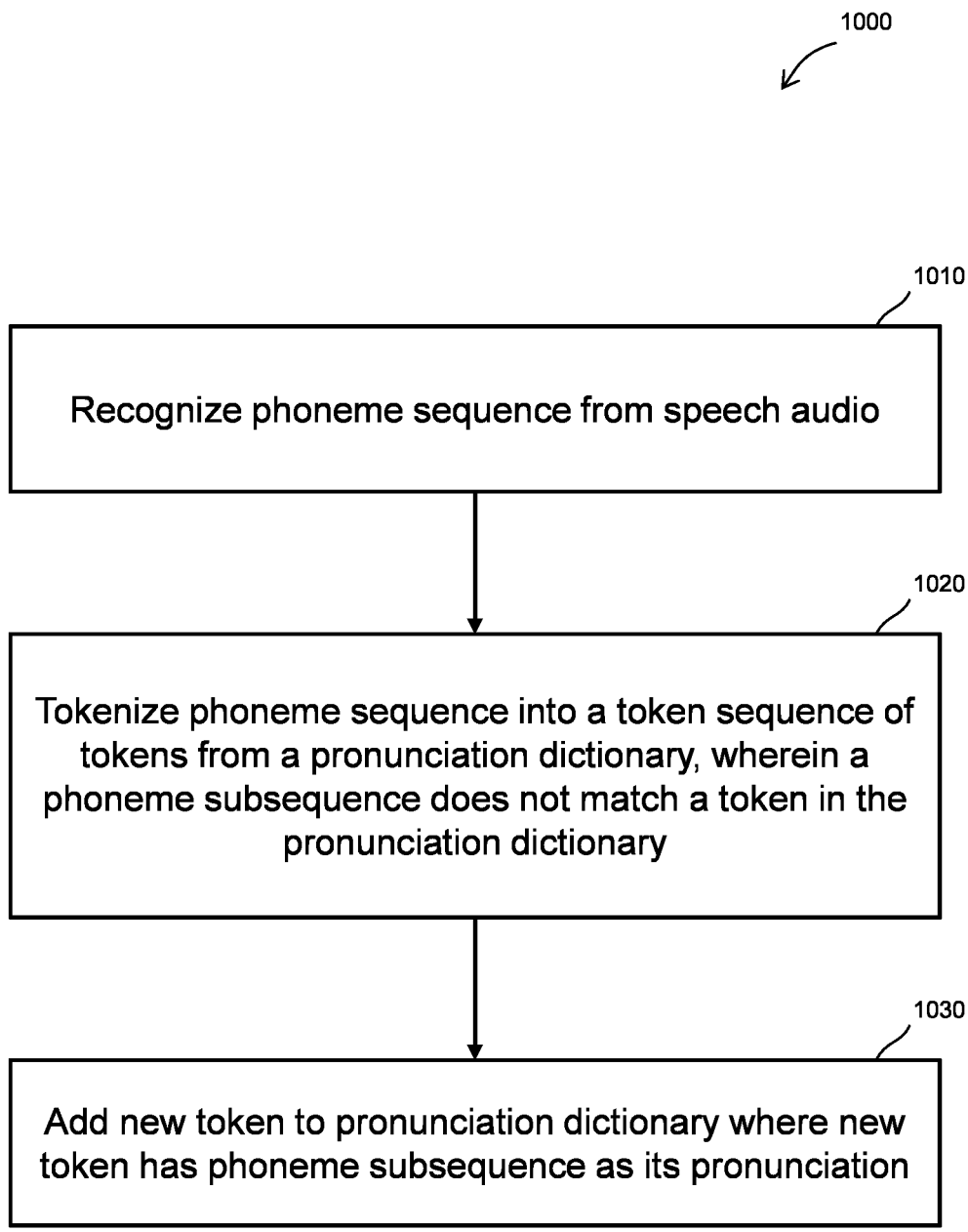
FIG. 10 illustrates a method for automatically enhancing natural language recognition based on adding a new token to a pronunciation dictionary.

FIG. 10 illustrates a method for automatically enhancing natural language recognition based on adding a new token to a pronunciation dictionary. A phoneme sequence can be recognized from speech audio at step 1010. The phoneme sequence can be tokenized into a token sequence of tokens from a pronunciation dictionary at step 1020. A phoneme subsequence within the phoneme sequence does not match a token in the pronunciation dictionary. A new token is then added to the pronunciation dictionary at step 1030. The new token has the phoneme subsequence as it's pronunciation.

Some ASR systems may increment the count of an unknown phoneme subsequence if its acoustic score or some combination of acoustic score, token sequence probability score, and natural language interpretation score exceeds a threshold. This prevents adding tokens from phoneme sequences that are incorrectly recognized and therefore unlikely to correspond to what users actually say.

These approaches to automating the adding of tokens ensure the addition of new tokens entering a language to the dictionary very quickly without the effort and delay of system developers performing research efforts. Of course, humans may edit the pronunciation dictionary as appropriate and remove or override undesirable tokens added automatically.

Adding Alternate Pronunciations of Tokens

Some tokens, such as the English word "good" (G UH D or G AH D) or the Mandarin Chinese character 好 (hǎo or hào), have multiple pronunciations. FIG. 6A shows a section of a pronunciation dictionary that includes the word "good" with pronunciation G UH D.

FIG. 6B shows a token sequence that an ASR system would recognize as a valid token sequence but for the final phoneme subsequence G AH D. An ASR system may search the pronunciation dictionary and compute the phoneme edit distance between the subsequence G AH D and the phoneme sequences corresponding to dictionary tokens. The phoneme edit distance is the number of phoneme changes (insertions, deletions, or replacements) between two sequences. The calculation of edit distance may down weight the distance for replacements compared to insertions and deletions since the number of phonemes in a sequence hypothesis is more likely to be correct than the actual phonemes themselves.

Figure 11:
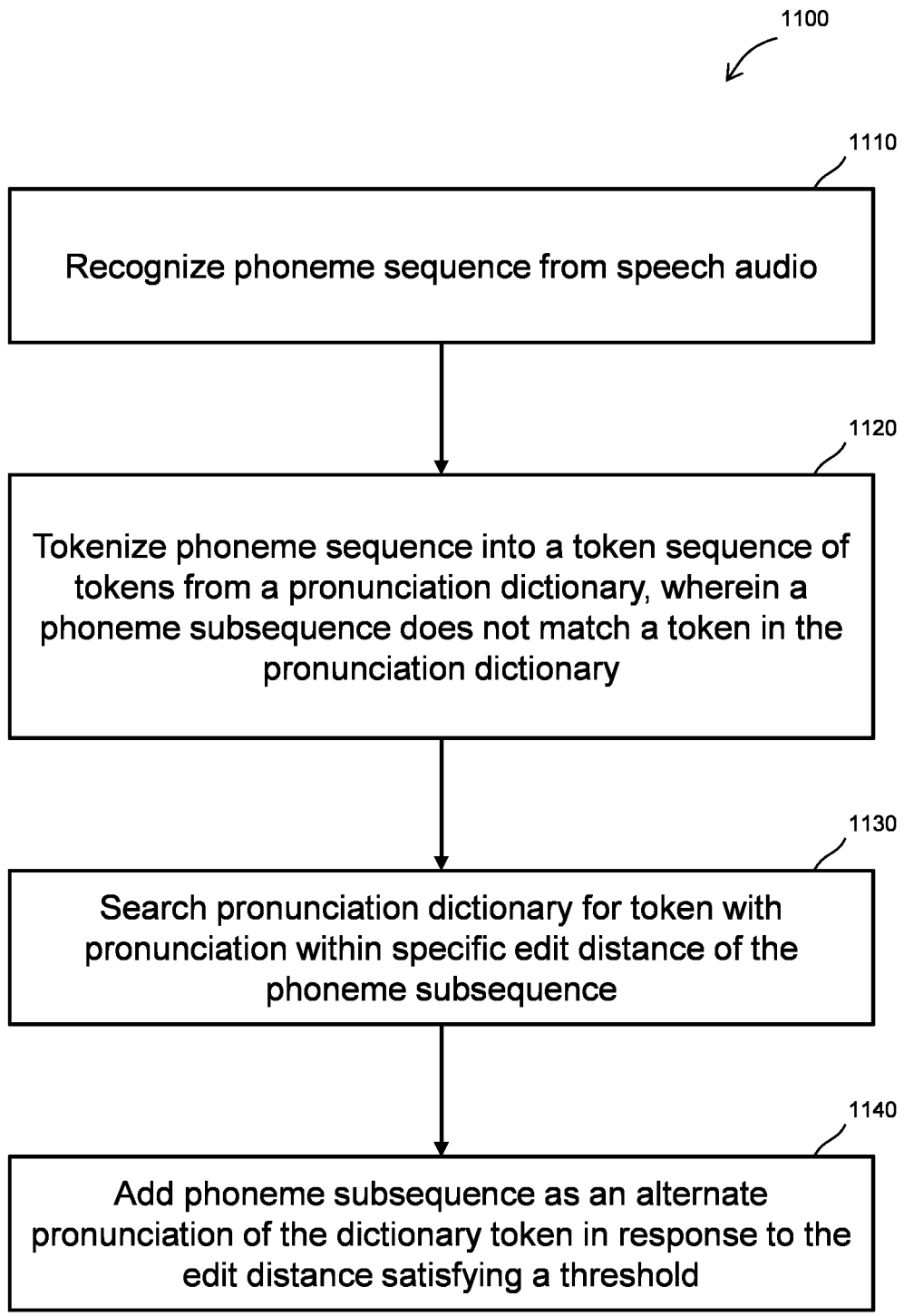
FIG. 11 illustrates a method for automatically enhancing natural language recognition based on, in response to the edit distance for a dictionary token being below a threshold, adding the phoneme subsequence as an alternate pronunciation of the dictionary token

FIG. 11 illustrates a method for automatically enhancing natural language recognition based on, in response to the edit distance for a dictionary token being below a threshold, adding the phoneme subsequence as an alternate pronunciation of the dictionary token. A phoneme sequence can be recognized from speech audio at step 1110. The phoneme sequence can be tokenized into a token sequence of tokens from a pronunciation dictionary at step 1120. A phoneme subsequence within the phoneme sequence does not match a token in the pronunciation dictionary.

A pronunciation dictionary is searched for a token having a pronunciation within a specific edit distance of the phoneme subsequence at step 1130. In some instances, the edit distance is inversely related to the phonetic similarity of the phonemes. The phoneme subsequence is then added as an alternate pronunciation of the dictionary token in response to the edit distance satisfying a threshold at step 1140. In some instances, the edit distance calculation may weight the distance by the similarity of phonemes. For example, the phonemes AH and UH are much closer than are AH and AE or AH and K. Accordingly, the edit distance is inversely related to the phonetic similarity of phonemes. The international phonetic alphabet (IPA) vowel diagram depicts the distance between vowel phonemes (for example IY and IH are closer than IY and AA) and the IPA pulmonic consonant chart depicts the distance between consonants (for example B is closer to P than B is to S).

Such an ASR system would calculate a small edit distance between the known token phoneme sequence G UH D and the unknown phoneme subsequence G AH D. If the edit distance is within a specific threshold distance, the ASR system may hypothesize that G AH D is an alternate pronunciation of the word "good".

As with adding tokens to a pronunciation dictionary described above, an ASR system may flag possible alternate pronunciations to a system developer to confirm and add to the dictionary, may keep occurrence counts and automatically add new alternate pronunciations, may keep domain specific or region specific occurrence counts, and may keep domain specific or region specific pronunciation dictionaries.

With the above approaches, it is possible for ASR to automatically learn new token pronunciations, thereby reducing the need for human effort and improving the speed of adding new pronunciations as they occur in the language.

Syntactic Grammar Parsing

Each token in a language can be used as one or more parts of speech. For example, the word "quickly" in English can only be used as an adverb whereas the English word "fast" can be a verb ("I fast before a feast"), noun ("I went on a fast to lose weight"), adjective ("I run fast to lose weight"), or adjective ("I am a fast runner"). Through the evolution of a language, certain tokens may take on acceptable usages as alternate parts of speech. For example, a noun may take on usage as the noun leverage ("the company has strong leverage") being used as a verb ("the company can leverage its strengths"). Similarly, examples exist of tokens with almost any part of speech used as any other part of speech. The use of tokens as different parts of speech is more common in some languages (such as Chinese) than others (such as English).

Syntactic grammars define linguistic rules for the ordering of tokens having different parts of speech. A token sequence can be parsed by a syntactic grammar if, by some choice of a known part of speech of each word, it is possible to construct a parse tree using legal ordering of part-of-speech.

Figure 7A:
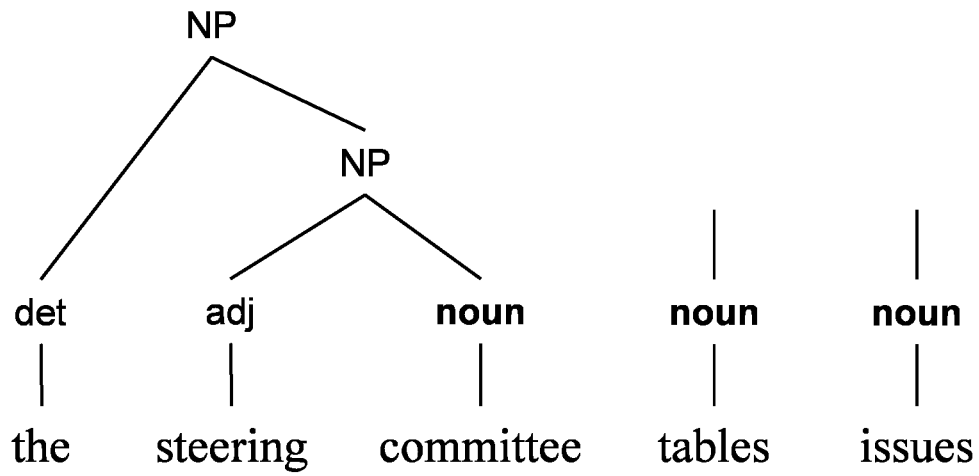
FIG. 7A shows a failure to complete a parse tree on part-of-speech tagged tokens according to a syntactic grammar.

In English, for example, there is no syntactic grammar rule that is satisfied with a sequence of three nouns in a row. Consider the example sentence of FIG. 7A, "the steering committee tables issues". Part-of-speech tagging would tag the tokens as a determiner, adjective, noun, noun, and noun, respectively. The first three tokens satisfy rules of a standard English syntactic grammar, but there is no set of rules satisfied by the final two tokens.

Figure 7B:
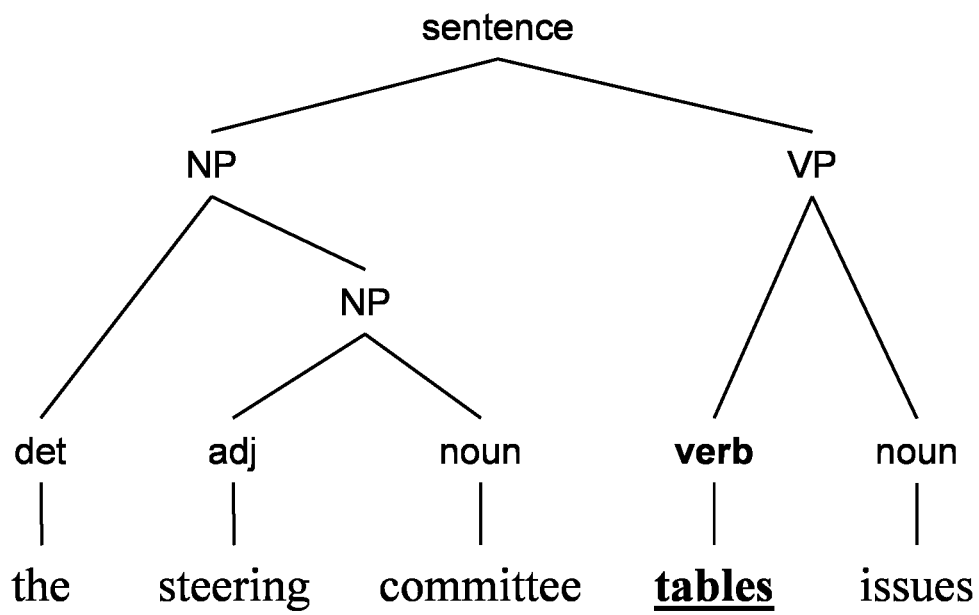
FIG. 7B shows a completed parse tree by tagging a token with an alternate part of speech.

An ASR system may perform part-of-speech tagging and parsing according to syntactic grammar rules. When it encounters a token sequence that it cannot parse, it may check to identify whether the sentence could be parsed if a particular token were tagged with a different part of speech. In the example sentence of FIG. 7A, most dictionaries would tag the token "tables" as a noun. However, an ASR system may detect that, as shown in FIG. 7B, if the token "tables" is a verb, the sentence could be parsed. As a result, the ASR system may note the verb alternate part of speech usage of the token "tables."

Figure 12:
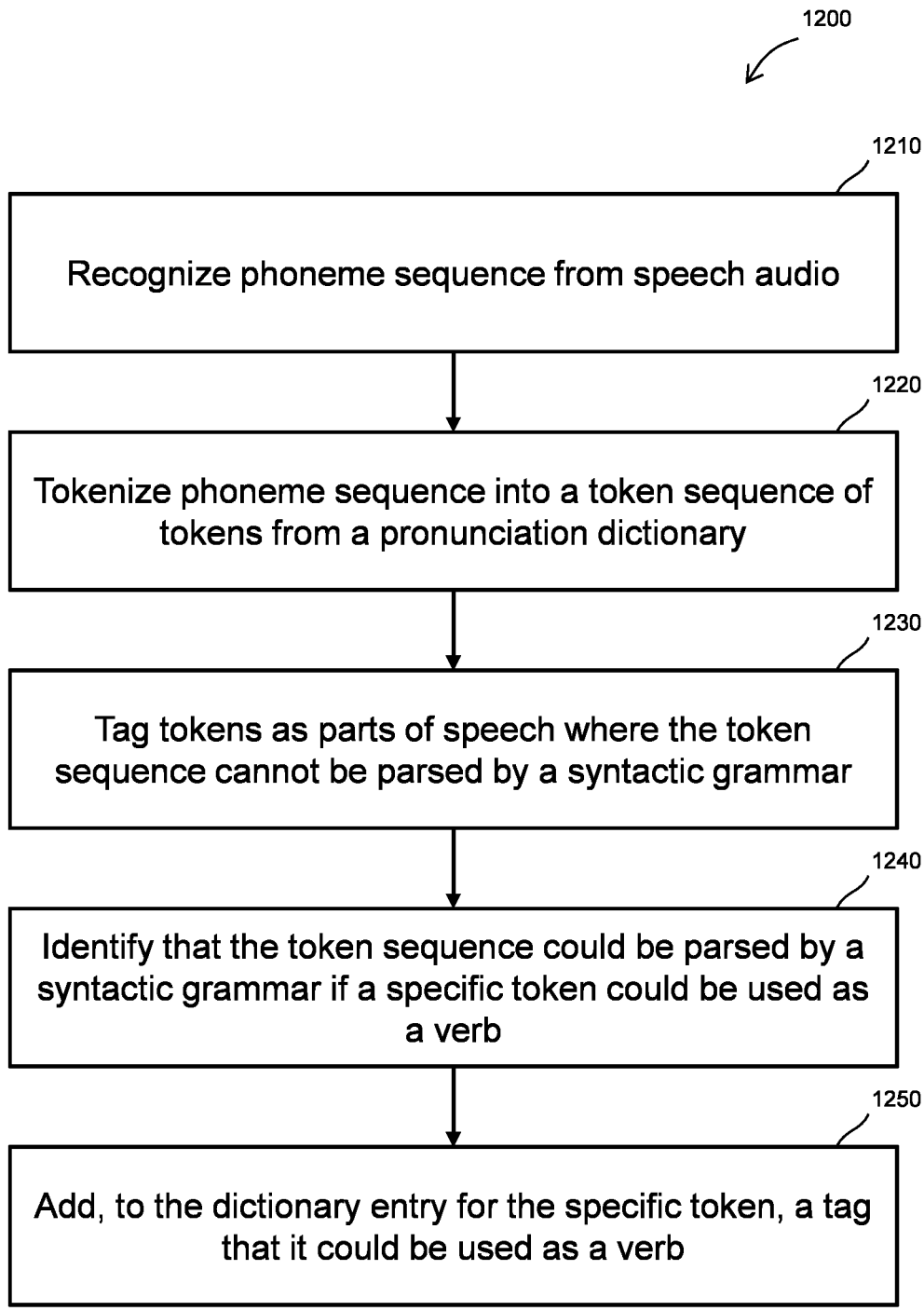
FIG. 12 illustrates a method for automatically enhancing natural language recognition based on identifying that a token sequence could be parsed by a syntactic grammar if a specific token could be used as a verb.

FIG. 12 illustrates a method for automatically enhancing natural language recognition based on identifying that a token sequence could be parsed by a syntactic grammar if a specific token could be used as a verb. A phoneme sequence can be recognized from speech audio at step 1210. The phoneme sequence can be tokenized into a token sequence of tokens from a pronunciation dictionary at step 1220. Tokens are tagged as parts of speech where the token sequence cannot be parsed by a syntactic grammar at step 1230. The system can then identify that the token sequence could be parsed by a syntactic grammar if a specific token could be used as a verb at step 1240. The system could then add, to the dictionary entry for the specific token, a tag that the token could be used as a verb.

The above approach is also useful to assign a part-of-speech tag to new unknown tokens. A system may initialize such tokens as a null part of speech and may learn their part of speech by finding syntactic grammar parses of sentences using the new token.

Notably, this approach can apply to both text and spoken expressions of sentences.

As with the cases above of adding new tokens or alternate pronunciations to a pronunciation dictionary, an ASR system may keep a list of occurrence counts of alternate part-of-speech tags for tokens. It may flag tokens to system developers, may compare occurrence counts to thresholds, and may keep domain specific, dialect specific, region specific, and user type occurrence counts or dictionaries.

The above approaches allow an ASR system to automatically learn usages of tokens as alternate parts of speech and learn the part of speech of new tokens within a language all with minimal human effort and improved speed of system improvement.

Adding to an Entity List

Figure 8:
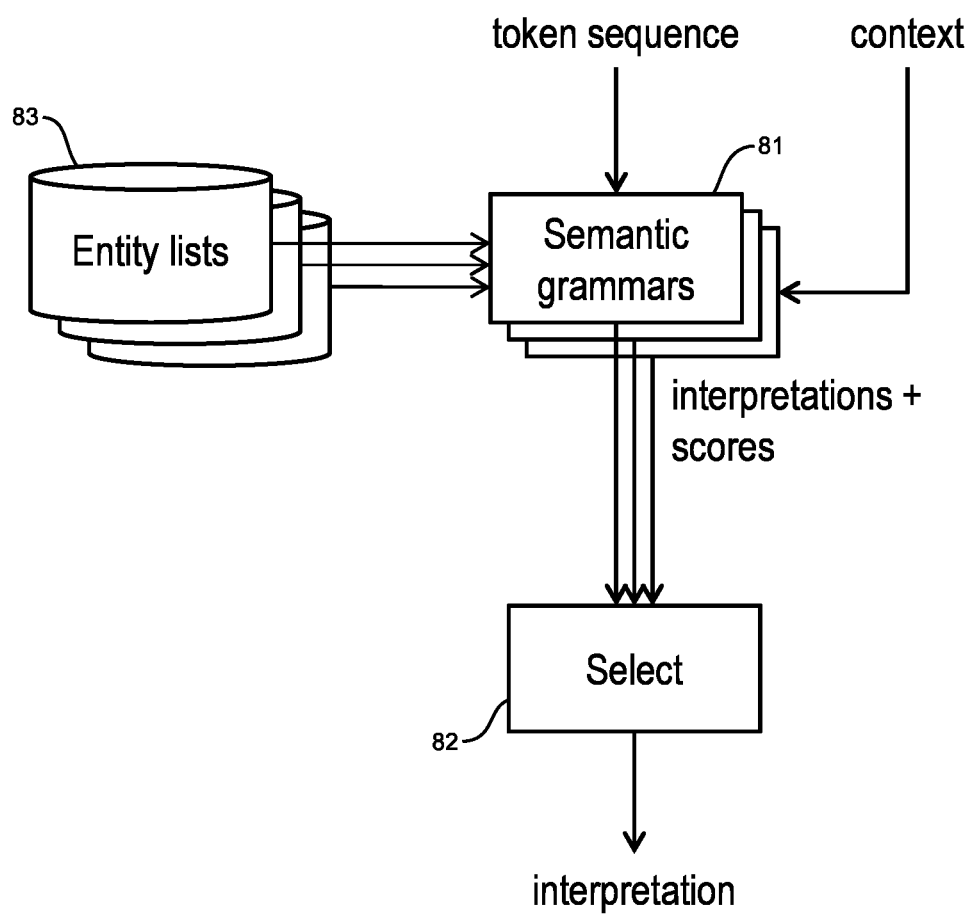
FIG. 8 shows interpreting a token sequence according to semantic grammars.

FIG. 8 shows a diagram of an example of NLU interpretations of token sequences. An NLU system compares token sequences to phrasings defined by one or more semantic grammars 81. The semantic grammars map the phrasing to an interpretation data structure. Semantic grammars may also assign a score to interpretations and a selection 82 determines a final chosen interpretation as the output of NLU.

Some semantic grammars may include phrasings that can apply to any specific value of a grammar slot. Semantic grammars may use slots for numbers. For example, a grammar "<NUMBER> plus <NUMBER>" is appropriate for an interpretation that invokes a function that performs addition of two numbers. As another example, a grammar "what's the weather in <PLACE> today" would be appropriate for an interpretation that invokes the lookup of a weather condition at any place name specified at the position of <PLACE> slot in the grammar phrasing.

However, a grammar should not match a token sequence if it has a token in the position of the <PLACE> slot that is not a place. For example a token sequence "what's the weather in New York today" should match the grammar because New York is a place name but "what's the weather in banana today" should not match the grammar because banana is not a place name. To confirm that a grammar matches, for some slot types such as place names, NLU checks the token or n-gram of multiple tokens in the slot position against an entity list 83 of known possible values for the slot. Known place names is an example of a type of entity for which many grammars use an entity list.

Figure 13:
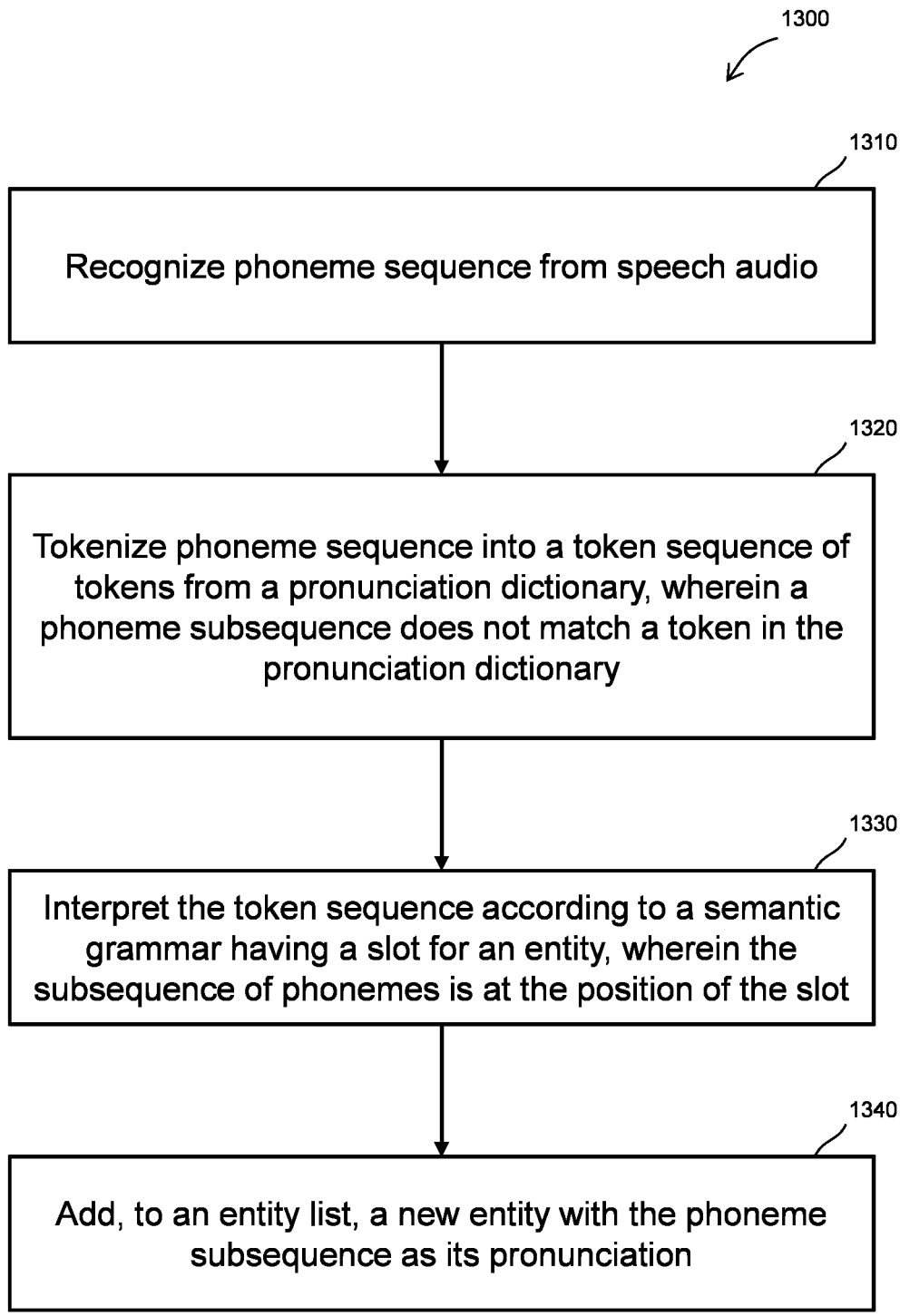
FIG. 13 illustrates a method for automatically enhancing natural language recognition based on interpreting a token sequence according to a semantic grammar having a slot for an entity, wherein the subsequence of phonemes is at the position of the slot.

FIG. 13 illustrates a method for automatically enhancing natural language recognition based on interpreting a token sequence according to a semantic grammar having a slot for an entity, wherein the subsequence of phonemes is at the position of the slot. A phoneme sequence can be recognized from speech audio at step 1110. The phoneme sequence can be tokenized into a token sequence of tokens from a pronunciation dictionary at step 1120. A phoneme subsequence within the phoneme sequence does not match a token in the pronunciation dictionary.

The token sequence can be interpreted according to a semantic grammar having a slot for an entity, wherein the subsequence of phonemes is at the position of the slot, at step 1330. The new entity is then added to an entity list at step 1230. The new entity includes the phoneme subsequence as its pronunciation.

Some NLU systems may also condition their grammars on context information such as recent conversation state. This allows a grammar to interpret "what's the weather there today" after a previous sentence "what's the time in New York" as an indication that the place name New York used in a PLACE slot of a time phrasing is used in the PLACE slot for the weather sentence.

FIG. 9A shows an example section of an entity list of place names. FIG. 9B shows a semantic grammar with a slot for a place name. NLU interpretation would consider the grammar to be a match with a successful interpretation for sentences that match the phrasing of the grammar with one or more tokens in the position of the <PLACE> slot if the one or more tokens match an entry in the entity list of FIG. 9A.

FIG. 9C shows a sentence "I skied heavenly yesterday" that would match the grammar except that the token "heavenly" does not match an entry on the entity list of FIG. 9A. The NLU system may send the sentence to a system developer to determine whether "heavenly" is actually an entity that belongs on the list (a place name in this example). Such a system developer might do a search and determine that Heavenly is the name of a ski resort in the state of Colorado, USA and therefore add to the entity list of place names "heavenly" as a new place name entity to be used for the grammar of FIG. 9B.

As with the cases above of an ASR system adding new tokens or alternate pronunciations to a pronunciation dictionary, or part of speech tags to tokens, an NLU system may maintain a list of occurrence counts of tokens or token sequences that, if they were entity values, would allow sentences with the token to be correctly interpreted by semantic grammars. The NLU system may flag such token sequences to system developers, may compare occurrence counts to thresholds, and may keep domain specific, region specific, dialect specific, or user specific entity lists.

An entity list may be used across multiple domains. For example, a weather domain and a travel domain may both use an entity list of city names. Furthermore, grammars may reference different types of entities, each having their own entity list. For example, a domain for a health care provider virtual assistant may have an entity list of medical professionals and an entity list of medicines. A grammar for such a domain might support a phrasing "give the <MEDICAL_PROFESSIONAL> <NUMBER> milligrams of <MEDICINE>".

For such a grammar, a NLU system may learn a new medicine name when an unknown word appears repeatedly at the position of the MEDICINE slot. The NLU system may also learn a new medical professional's name when it appears repeated at the position of the MEDICAL PROFESSIONAL slot. When entity lists are domain specific, this provides for not just learning entities related to a domain, but also learning what types of entities they are.

Notably, this approach can apply to both text and spoken expressions of sentences.

Furthermore, this approach may be used on new tokens entering a language to determine what, if any, entity lists should contain the new token. If, for example, users suddenly start to frequently discuss news events about a newly elected leader of a country, an ASR system may automatically add the name of the new leader as a token in a pronunciation dictionary, may recognize multiple pronunciations of the name, may recognize that the name is a noun, and a related NLU system may add the name as a new entity to an entity list of famous people's names.

This approach has a benefit of overcoming the tendency of SLMs, syntactic grammars, and semantic grammars giving low probability scores to sentences with new entity names. Consider the sentence "will it rain in drawbridge tomorrow". Drawbridge is a ghost town in the state of California, USA. A token sequence probability analysis according to an SLM would be likely to give it a low score because very few language model training token sequences use the word "drawbridge" in that context. An English syntactic grammar would parse drawbridge as a singular generic noun for which it would expect a preceding determiner ("the", "a", or "an"). Without that, a syntactic grammar parse would likely consider the sentence a failure. Furthermore, lists of cities and towns might not include towns as small as Drawbridge (population 0). Using the above approach, a system will learn that this is a proper usage of the token in sentences.

This can all be done with little human effort and immediately after a certain threshold number of user references to a new token, pronunciation, part-of-speech, or entity reach a reasonable threshold. That may be much faster than a developer-controlled ASR and NLU system, which can provide an improved user experience to a large number of users of voice virtual assistants or other devices with speech and natural language interfaces.

CRMs

Figure 14A:
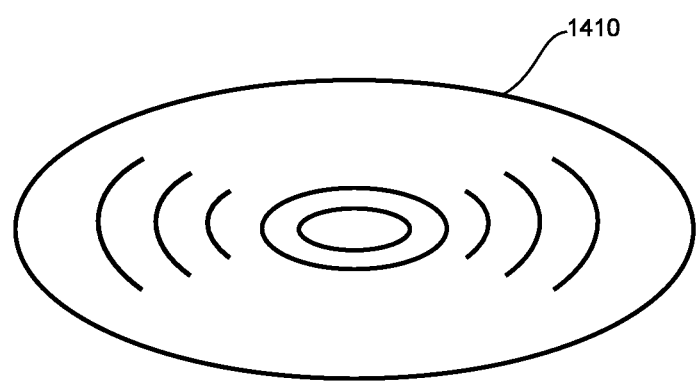
FIG. 14A shows a non-transitory computer readable medium.

Various examples described above may be implemented with computers by running software embodied as instructions on non-transitory computer readable media. FIG. 14A shows an example non-transitory computer readable medium 1410 that is a rotating magnetic disk. Data centers commonly use magnetic disks to store data and code comprising instructions for server processors. Non-transitory computer readable medium 1410 stores code comprising instructions that, if executed by one or more computers, would cause the computer to perform steps of methods described herein. Rotating optical disks and other mechanically moving storage media are possible.

Figure 14B:
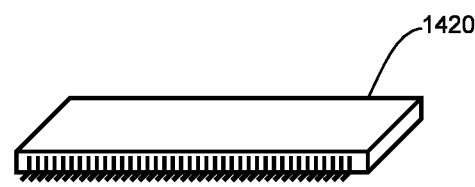
FIG. 14B shows another non-transitory computer readable medium.

FIG. 14B shows an example non-transitory computer readable medium 1420 that is a Flash random access memory (RAM) chip. Data centers commonly use Flash memory to store data and code for server processors. Mobile devices commonly use Flash memory to store data and code for processors within system-on-chip devices. Non-transitory computer readable medium 1420 stores code comprising instructions that, if executed by one or more computers, would cause the computer to perform steps of methods described herein. Other non-moving storage media packaged with leads or solder balls are possible.

The SoC

Figure 15A:
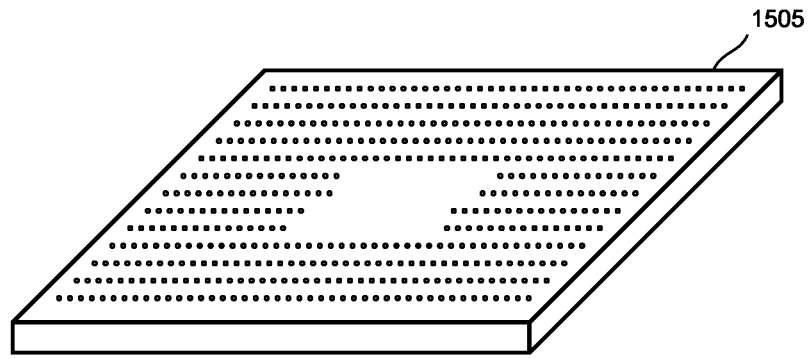
FIG. 15A shows a packaged system-on-chip device.

Various examples described above may be implemented with processors in system-on-chip devices. FIG. 15A shows the bottom side of a packaged system-on-chip device 1505 with a ball grid array for surface-mount soldering to a printed circuit board. Various package shapes and sizes are possible for various chip implementations. System-on-chip (SoC) devices control many embedded systems, IoT device, mobile, portable, and wireless implementations.

Figure 15B:
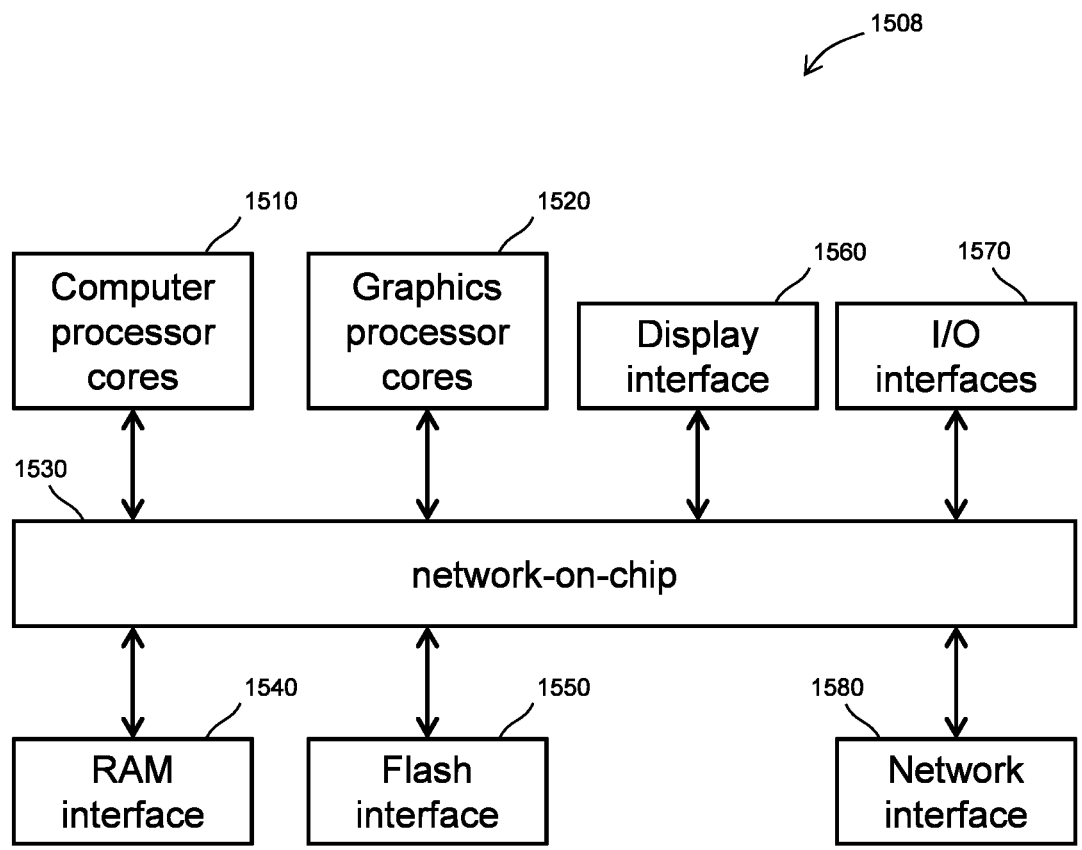
FIG. 15B shows a block diagram of a system-on-chip.

FIG. 15B shows a block diagram of the system-on-chip 1508. It comprises a multicore cluster of computer processor (CPU) cores 1510 and a multicore cluster of graphics processor (GPU) cores 1520. The processors connect through a network-on-chip 1530 to an off-chip dynamic random access memory (DRAM) interface 1540 for volatile program and data storage and a Flash interface 1550 for non-volatile storage of computer program code in a Flash RAM non-transitory computer readable medium. SoC 1508 also has a display interface 1560 for displaying a graphical user interface (GUI) and an I/O interface module 1570 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 1508 also comprises a network interface 1580 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 1540 or Flash devices through interface 1550, the CPUs 1510 and GPUs 1520 perform functionality as described herein.

The Server

Figure 16A:
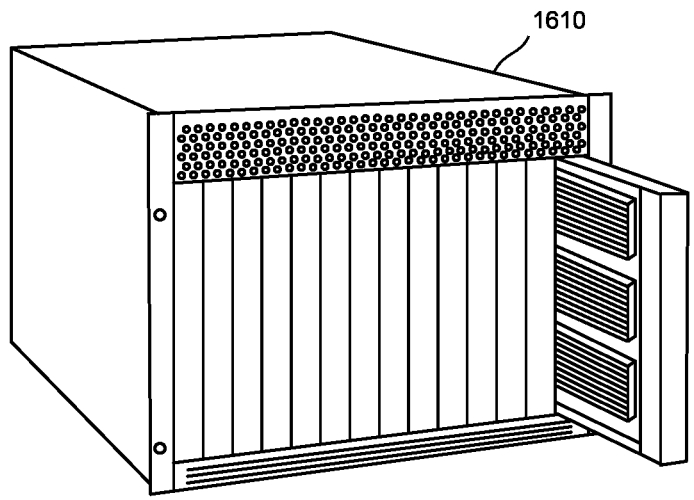
FIG. 16A shows a rack-mounted server blade.

FIG. 16A shows a rack-mounted server blade multi-processor server system 1610. This is an example of a computerized implementation in cloud data centers. Server system 1610 comprises a multiplicity of network-connected computer processors that run software in parallel.

Figure 16B:
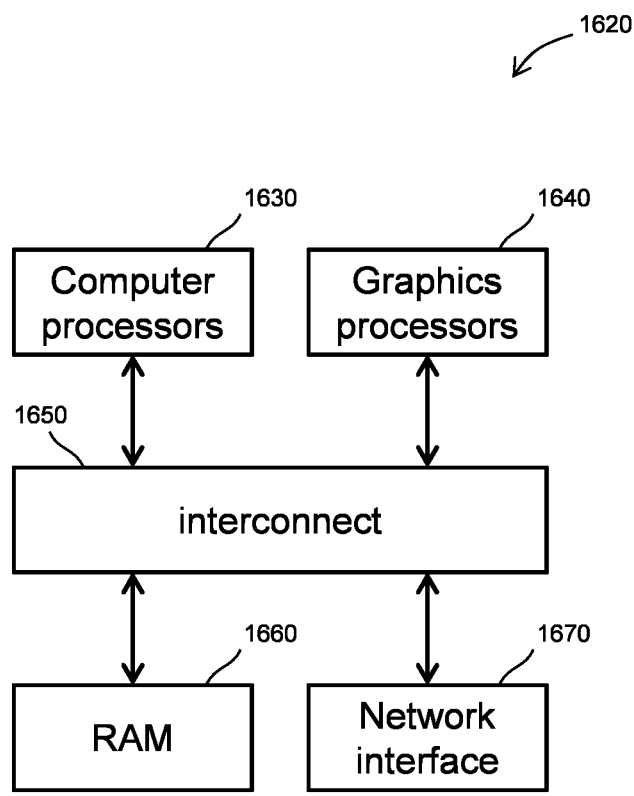
FIG. 16B shows a block diagram of a server system.

FIG. 16B shows a block diagram of the server system 1620. It comprises a multicore cluster of computer processor (CPU) cores 1630 and a multicore cluster of graphics processor (GPU) cores 1640. The processors connect through a board-level interconnect 1650 to random-access memory (RAM) devices 1660 for program code and data storage. Server system 1620 also comprises a network interface 1670 to allow the processors to access the Internet. By executing instructions stored in RAM devices 1660, the CPUs 1630 and GPUs 1640 perform functionality as described herein.

Implementation Variations

Examples shown and described use certain spoken languages. Various embodiments operate, similarly, for other languages or combinations of languages. Examples shown and described use certain domains of knowledge. Various systems operate similarly for other domains or combinations of domains.

Some systems are screenless, such as an earpiece, which has no display screen. Some systems are stationary, such as a vending machine. Some systems are mobile, such as an automobile. Some systems are portable, such as a mobile phone. Some systems are for implanting in a human body. Some systems comprise manual interfaces such as keyboards or touchscreens. Some systems comprise neural interfaces that use human thoughts as a form of natural language expression.

Some systems function by running software on general-purpose programmable processors (CPUs) such as ones with ARM or x86 architectures. Some power-sensitive systems and some systems that require especially high performance such as for neural network algorithms use hardware optimizations. Some systems use application-customizable processors with configurable instruction sets in specialized systems-on-chip, such as ARC processors from Synopsys and Xtensa processors from Cadence. Some systems use dedicated hardware blocks burned into field programmable gate arrays (FPGAs). Some systems use arrays of graphics processing units (GPUs). Some systems use application-specific-integrated circuits (ASICs) with customized logic to give best performance. Some systems are in hardware description language code such as code written in the language Verilog.

Some systems of physical machines described and claimed herein are programmable in numerous variables, combinations of which provide essentially an infinite variety of operating behaviors. Some systems herein are configured by software tools that provide numerous parameters, combinations of which provide for essentially an infinite variety of machine embodiments.

Hardware blocks, custom processor instructions, co-processors, and hardware accelerators perform neural network processing or parts of neural network processing algorithms with particularly high performance and power efficiency. This provides long battery life for battery-powered devices and reduces heat removal costs in data centers that serve many client devices simultaneously.

Descriptions herein reciting principles, features, and embodiments encompass structural and functional equivalents thereof. Practitioners skilled in the art will recognize many modifications and variations.

What is claimed is:

1. A computer-implemented method for automatically enhancing natural language recognition in an Automated Speech Recognition (ASR) system, the method comprising:
   receiving digitized speech audio comprising one or more of a directly digitized audio waveform, a spectrogram and a spectrogram processed into mel filter bank bin values;
   producing, via an acoustic model, a phoneme sequence based on the digitized speech audio;
   generating a token sequence from the phoneme sequence via a pronunciation dictionary, wherein a token represents a word in the pronunciation dictionary;
   identifying a phoneme subsequence from the phoneme sequence that does not match a token in the pronunciation dictionary;
   identifying, via applying a semantic grammar to the token sequence, a slot for an entity where the phoneme subsequence fits in the semantic grammar, wherein the phoneme subsequence represents a new entity in the semantic grammar;
   adding a new token to the pronunciation dictionary, the new token having the phoneme subsequence as its pronunciation; and
   adding, to an entity list that is domain specific, the new entity with the phoneme subsequence as its pronunciation.

2. The computer-implemented method of claim 1 further comprising:
   incrementing an occurrence count of the phoneme subsequence across a multiplicity of speech audio segments,
   wherein the adding step is conditioned upon the occurrence count exceeding a threshold.

3. The computer-implemented method of claim 1 further comprising:
   updating the token sequence probabilities of a statistical language model including the new entity.

4. A non-transitory computer readable medium comprising code that, if executed by a computer, would cause the computer to:
   receiving digitized speech audio comprising one or more of a directly digitized audio waveform, a spectrogram and a spectrogram processed into mel filter bank bin values;
   producing, via an acoustic model, a phoneme sequence based on the digitized speech audio;
   generating a token sequence from the phoneme sequence via a pronunciation dictionary, wherein a token represents a word in the pronunciation dictionary;

identifying a phoneme subsequence from the phoneme sequence that does not match a token in the pronunciation dictionary;

identifying, via applying a semantic grammar to the token sequence, a slot for an entity where the phoneme subsequence fits in the semantic grammar, wherein the phoneme subsequence represents a new entity in the semantic grammar;

adding a new token to the pronunciation dictionary, the new token having the phoneme subsequence as its pronunciation; and add, to an entity list that is domain specific, a new entity with the phoneme subsequence as its pronunciation.

5. The non-transitory computer readable medium of claim 4 further comprising causing the computer to:

increment an occurrence count of the phoneme subsequence across a multiplicity of speech audio segments, wherein the adding step is conditioned upon the occurrence count exceeding a threshold.

6. The non-transitory computer readable medium of claim 4 further comprising causing the computer to:

update the token sequence probabilities of a statistical language model including the new entity.

\* \* \* \* \*